US006837049B2

(12) United States Patent
Ogawa et al.

(10) Patent No.: US 6,837,049 B2
(45) Date of Patent: Jan. 4, 2005

(54) VEHICLE DRIVING DEVICE

(75) Inventors: Ken Ogawa, Wako (JP); Yasushi Okada, Wako (JP); Tsuyoshi Baba, Wako (JP); Shigeru Ibaraki, Wako (JP)

(73) Assignee: Honda Giken Kogyo Kabushiki Kaisha, Tokyo (KP)

( * ) Notice: Subject to any disclaimer, the term of this patent is extended or adjusted under 35 U.S.C. 154(b) by 0 days.

(21) Appl. No.: 10/398,810

(22) PCT Filed: Oct. 5, 2001

(86) PCT No.: PCT/JP01/08826

§ 371 (c)(1), (2), (4) Date: Sep. 15, 2003

(87) PCT Pub. No.: WO02/31335

PCT Pub. Date: Apr. 18, 2002

(65) Prior Publication Data

US 2004/0045292 A1 Mar. 11, 2004

(30) Foreign Application Priority Data

Oct. 10, 2000 (JP) ........................................ 2000-314449

(51) Int. Cl.[7] .................................................. F03G 3/00
(52) U.S. Cl. .............................. 60/614; 60/616; 60/618
(58) Field of Search ........................... 60/614, 616, 618

(56) References Cited

U.S. PATENT DOCUMENTS 3,986,575 A * 10/1976 Eggmann .................... 180/302
5,979,396 A * 11/1999 Yasuoka ..................... 123/295
6,247,311 B1 * 6/2001 Itoyama et al. ............... 60/602
6,369,539 B1 * 4/2002 Morimoto et al. .......... 318/369

FOREIGN PATENT DOCUMENTS

| | | | |
|---|---|---|---|
| EP | 0 556 568 | A1 | 8/1993 |
| JP | 5-340241 | A | 12/1993 |
| JP | 10-252557 | A | 9/1998 |
| JP | 2000-230440 | A | 8/2000 |

* cited by examiner

*Primary Examiner*—Hoang Nguyen
(74) *Attorney, Agent, or Firm*—Birch, Stewart, Kolasch & Birch, LLP

(57) ABSTRACT

In a vehicle designed so that a driven wheel is driven by uniting an output from an engine and an output from a Rankine cycle system to each other, an accelerator pedal and a throttle valve are connected electrically to each other by a DBW control unit. When an accelerator opening degree (θap) commanded by a driver is increased, a throttle opening degree (θth) is increased by a correcting amount (Δθth) more than a value proportional to the accelerator opening degree (θap), thereby compensating for an output shortage due to a response delay of the output from the Rankine cycle system. When the accelerator opening degree (θap) commanded by the driver is decreased, the throttle opening degree (θth) is decreased by the correcting amount (Δθth) more than the value proportional to the accelerator opening degree (θap), thereby compensating for an output excessiveness due to the response delay of the output from the Rankine cycle system.

7 Claims, 10 Drawing Sheets

VEHICLE DRIVING DEVICE

This application is the national phase under 35 U.S.C. § 371 of PCT International Application No. PCT/JP01/08826 which has an International filing date of Oct. 5, 2001, which designated the United States of America.

FIELD OF THE INVENTION

The present invention relates to a propelling system for a vehicle, including a Rankine cycle system for converting a heat energy of an exhaust gas from an engine into a mechanical energy to output the mechanical energy, so that a driven wheel is driven by a total output resulting from the uniting of an output from the engine and an output from the Rankine cycle system.

BACKGROUND ART

There is a propelling system for a vehicle, which is conventionally known from Japanese Patent Application Laid-open No. 5-340241, wherein a heat energy of an exhaust gas from an engine is converted into a mechanical energy by a Rankine cycle system mounted on the vehicle, and the mechanical energy is united to a driving force from a crankshaft of the engine to assist in the traveling of the vehicle.

It should be noted here that in the conventional vehicle, an accelerator pedal operated by a driver and a throttle valve of an engine are connected mechanically to each other by a cable, so that an accelerator opening degree and a throttle opening degree are matched to each other at 1:1. For this reason, when the driving force from the engine and the driving force from the Rankine cycle system are united to each other to drive the driven wheel, the following disadvantages arise due to a delay of response of the Rankine cycle system:

As shown in FIG. 10, in the conventional vehicle including the accelerator pedal and the throttle valve connected mechanically to each other by the cable, the throttle opening degree is varied substantially without a response delay in proportion to the accelerator opening degree, and the engine output is varied substantially without a response delay in proportion to the throttle opening degree. However, it is difficult for the output from the Rankine cycle system operated by the exhaust gas from the engine to follow the accelerator opening degree accurately, because the change in heat energy of the exhaust gas from engine has a response delay of about 0.5 second (a first-stage response delay) with respect to the change in accelerator opening degree due to an influence such as an abatement of heat in an exhaust port, and the change in heat energy of vapor generated in an evaporator has a response delay of about 5 seconds (a second-stage response delay) with respect to the change in heat energy of the exhaust gas due to an influence such as a thermal capacity of a heat transfer pipe.

As a result, immediately after the driver has stepped on the accelerator pedal, the output from the engine is increased immediately, whereas the output from the Rankine cycle system is increased with a response delay. For this reason, a total output resulting from the addition of the output from the engine and the output from the Rankine cycle system to each other is temporarily deficient, resulting in the arising of a disadvantage that the driver feels a sense of incompatibility (see a portion indicated by a). Immediately after the driver has returned the accelerator pedal, the output from the engine is decreased immediately, and the output from the Rankine cycle system is decreased with a response delay.

Therefore, a total output resulting from the addition of the output from the engine and the output from the Rankine cycle system to each other is temporarily excessive, resulting in the arising of a disadvantage that the driver feels a sense of incompatibility (see a portion indicated by b).

DISCLOSURE OF THE INVENTION

The present invention has been accomplished with the above circumstances in view, and it is an object of the present invention to ensure that in a vehicle designed so that a driven wheel is driven by uniting an output from an engine and an output from a Rankine cycle system, a response delay of the output from the Rankine cycle system is compensated for to eliminate the sense of incompatibility of a driver.

To achieve the above object, according to a first aspect and feature of the present invention, there is proposed a propelling system for a vehicle comprising a Rankine cycle system for converting a heat energy of an exhaust gas from an engine into a mechanical energy to output the mechanical energy, so that a driven wheel is driven by a total output resulting from the uniting of the output from the engine and the output from the Rankine cycle system to each other, characterized in that the propelling system includes a control means for controlling a throttle opening degree of the engine by correcting an accelerator opening degree commanded by a driver, and the control means controls the throttle opening degree of the engine, so that the total output assumes a value corresponding to the accelerator opening degree, in order to compensate for a response delay of the output from the Rankine cycle system.

With the above arrangement, the accelerator opening degree commanded by the driver is corrected to control the opening degree of the throttle valve of the engine, so that the total output resulting from the uniting of the output from the engine and the output from the Rankine cycle system assumes the value corresponding to the accelerator opening degree. Therefore, it is possible to eliminate the shortage of the output generated upon stepping-on of an accelerator pedal due to a response delay of the output from the Rankine cycle system and the excessiveness of the output generated upon returning of the accelerator pedal, thereby providing an operational feeling free from a sense of incompatibility.

BRIEF DESCRIPTION OF THE DRAWINGS

FIG. 1 is a diagram showing the entire arrangement of a propelling system from a vehicle;

FIG. 2 is a diagram showing the arrangement of a control system for a throttle DBW motor;

FIG. 3 is a flow chart for explaining the operation of the first embodiment;

FIG. 4 is a diagram showing a map for searching a heat exchange efficiency ηevp of an evaporator;

FIG. 5 is a diagram showing a map for searching an ideal expander output Out2 free from a response delay;

FIG. 6 is a diagram showing a map showing the relationship between the throttle opening degree and the engine output;

FIG. 7 is a time chart for explaining the operation of the propelling system fro the vehicle;

BEST MODE FOR CARRYING OUT THE INVENTION

A first embodiment of the present invention will now be described with reference to FIGS. 1 to 7.

Figure 1:
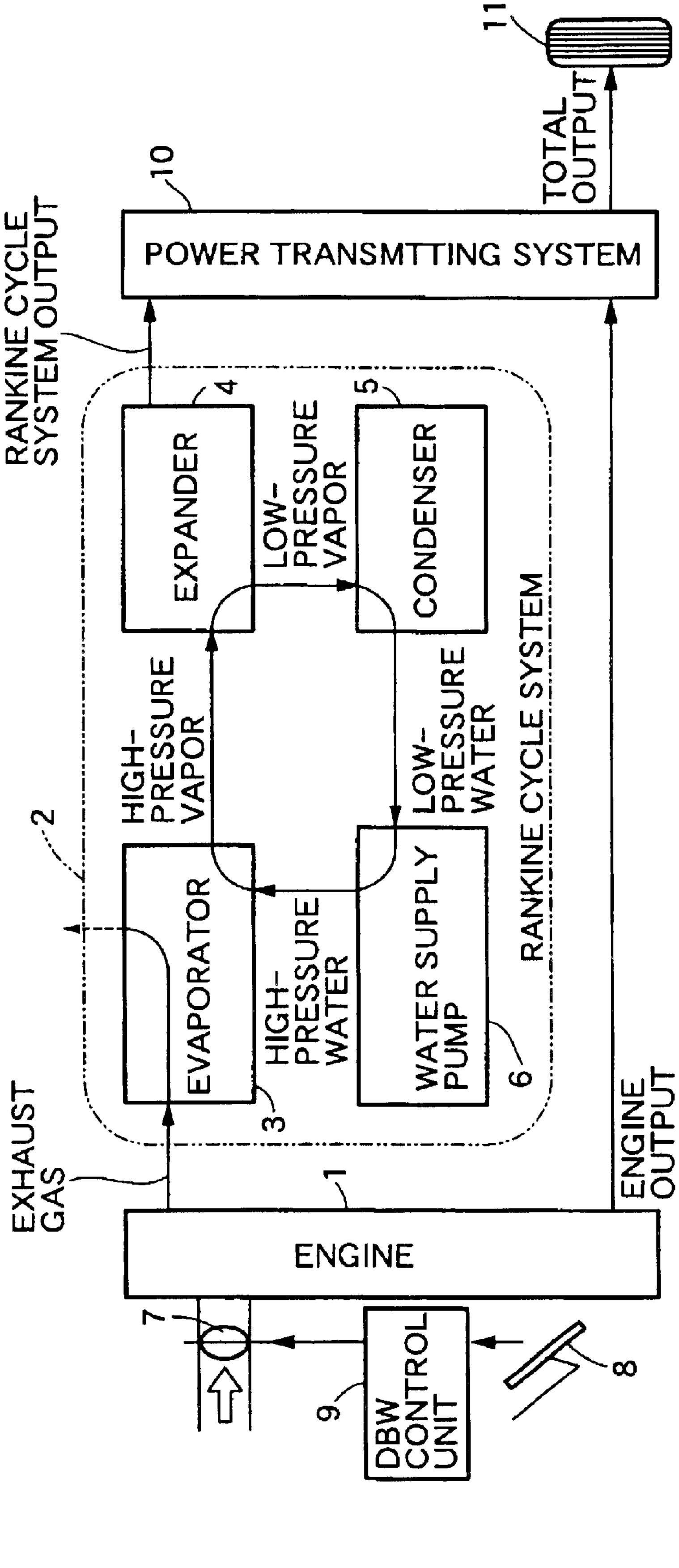
FIGS. 1 to 7 show a first embodiment of the present invention.

As shown in FIG. 1, a Rankine cycle system 2 operated by an engine 1 mounted on a vehicle has a known structure and includes an evaporator 3 for generating a high-temperature and high-pressure vapor using a waste heat from the engine 1, e.g., an exhaust gas as a heat source, an expander 4 for generating a shaft output by the expansion of the high-temperature and high-pressure vapor, a condenser 5 for condensing a dropped-temperature and dropped-pressure vapor discharged from the expander 4 back to water, and a water supply pump 6 for supplying the water from the condenser 5 in a pressurized state to the evaporator 3. A throttle valve 7 mounted in an intake passage for the engine 1 is electrically connected to an accelerator pedal 8 operated by a driver through DBW (Drive by Wire) control unit 9. The DBW control unit 9 converts the amount of accelerator pedal 8 operated into an electric signal to operate the throttle valve 7 through an actuator and is capable of correcting an accelerator opening degree θap to any value to control a throttle opening degree θth. An output from the engine 1 and an output from the Rankine cycle system 2 are united together in a driving force transmitting system 10 including, for example, a planetary gear mechanism, and are transmitted to a driven wheel 11.

Figure 2:
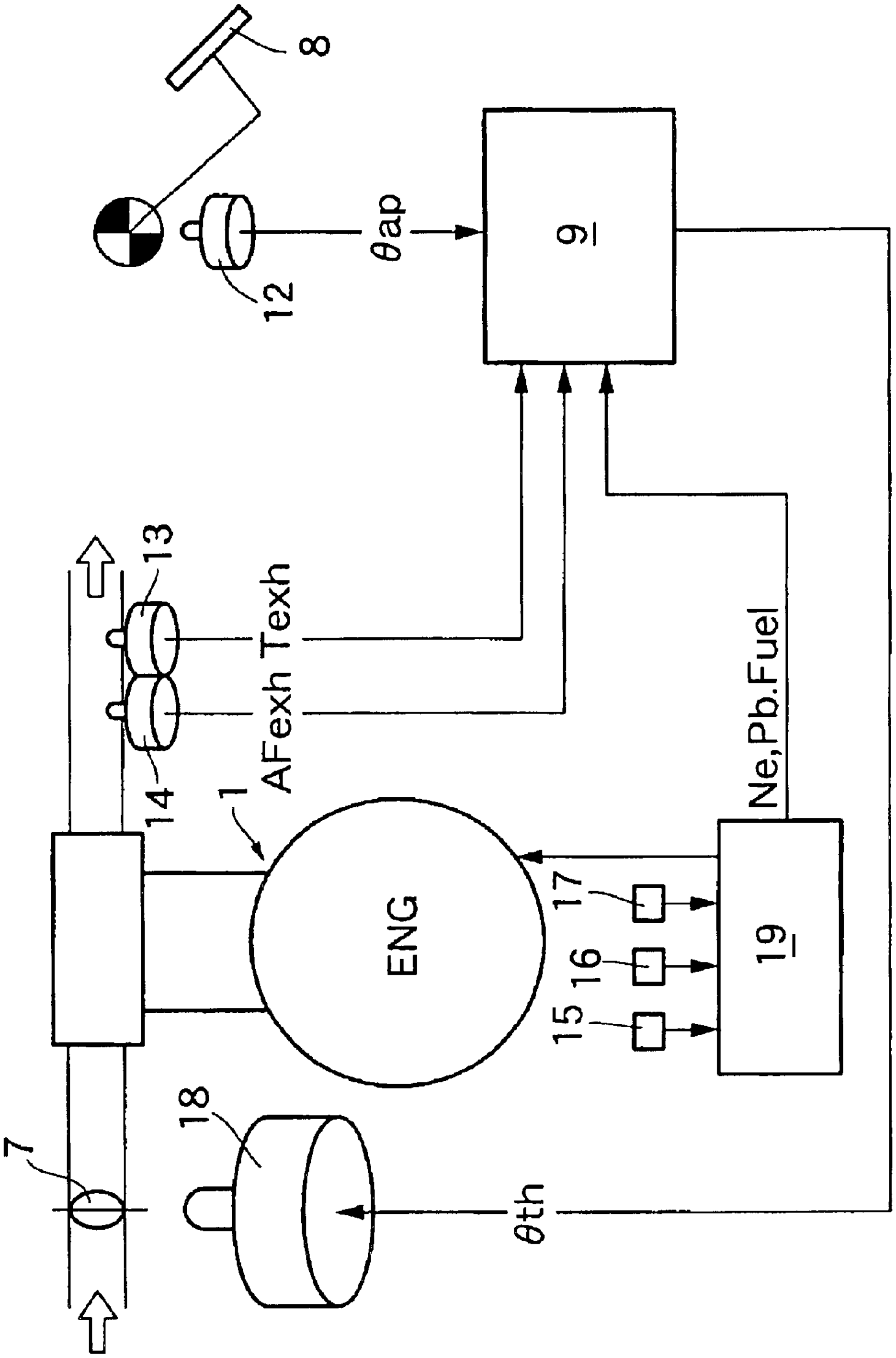

As shown in FIG. 2, input to the DBW control unit 9 are an accelerator opening degree θap detected by an accelerator opening degree sensor 12 mounted on the accelerator pedal 8, a temperature Texh of an exhaust gas detected by an exhaust gas temperature sensor 13 mounted in an exhaust passage, and an air fuel ratio AFexh detected by an exhaust gas linear air fuel ratio sensor 14 mounted in the exhaust passage. Input to an engine control unit 19 for controlling the operational state of the engine 1 are an engine rotational speed Ne detected by an engine rotational speed sensor 15, an intake negative pressure Pb detected by an intake negative pressure sensor 16, and an injected-fuel amount Fuel detected by an injected-fuel amount sensor 17. The engine rotational speed Ne, the intake negative pressure Pb and the injected-fuel amount Fuel are input from the engine control unit 19 to the DBW control unit 9. The DBW control unit 9 calculates a target throttle opening degree θth based on the accelerator opening degree θap, the temperature Texh of the exhaust gas, the air fuel ratio AFexh, the engine rotational speed Ne, the intake negative pressure Pb and the injected-fuel amount Fuel, and controls the operation of a throttle DBW motor 18 for driving the throttle valve 7 mounted in the intake passage, based on the throttle opening degree θth.

A target injected-fuel amount previously possessed by the engine control unit 19 may be substituted for the injected-fuel amount Fuel, and a target air fuel ratio previously possessed by the engine control unit 19 may be substituted for the air fuel ratio AFexh.

When the driver operates the accelerator pedal 8, the throttle DBW motor 18 is operated, whereby the throttle opening degree θth is changed, and the output from the engine 1 is changed with a slight response delay (equal to or less than 0.1 second) from the operation of the accelerator pedal 8, i.e., from the change in throttle opening degree θth. When the output from the engine 1 is changed, the temperature and flow rate of the exhaust gas are changed, but a response delay (about 0.5 sec.) due to an abatement of heat in an exhaust port is generated until the temperature and flow rate of the exhaust gas reach steady states. When the temperature and flow rate of the exhaust gas are changed, the heat exchange is conducted between the exhaust gas and water in the evaporator 3 to generate vapor, but a response delay due to the heat transfer through a heat-transfer pipe is generated. This response delay is varied depending on the flow speed of the exhaust gas, and is a little under 5 seconds when the flow speed is large, and a little over 5 seconds, when the flow rate is small. Even when the heat energy of the vapor generated in the evaporator 3 is converted into a mechanical energy in the expander 4, a response delay (equal to or less than 0.5 sec.) due to the inertia of the expander 4 is generated.

In the present embodiment, among the four types of the response delays, the first and last relatively small response delays are disregarded, and the second and third relatively large response delays are taken into consideration to control the operation of the throttle DBW motor 18. The response delay (about 0.5 sec.) until the temperature and flow rate of the exhaust gas reach steady states is defined as a first-stage response delay τexh, and the response delay (about 5 sec.) due to the heat transfer in the evaporator 3 is defined as a second-stage response delay τevp.

Figure 3:
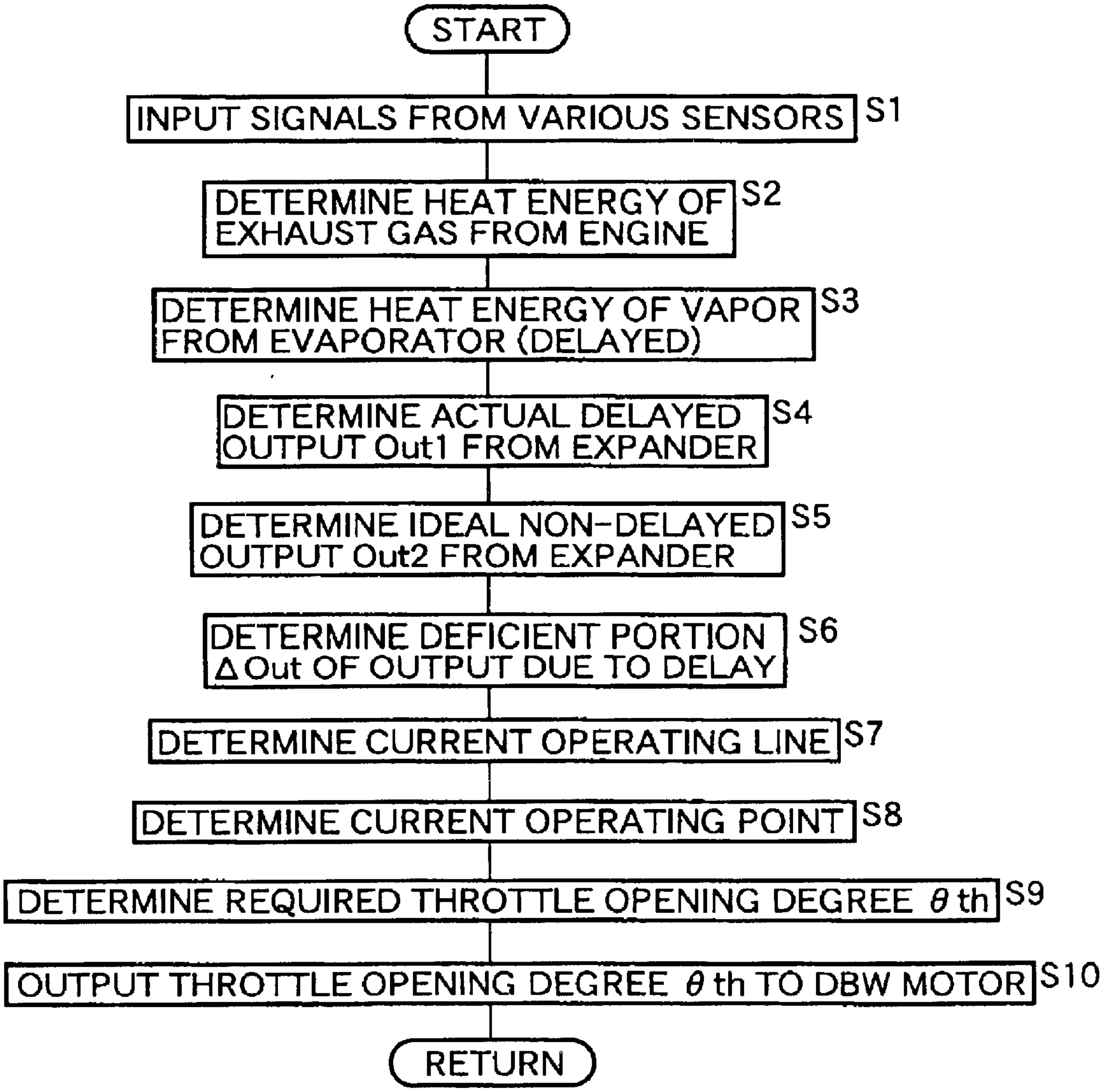

The operation of the first embodiment will be described below with reference to a flow chart shown in FIG. 3.

First, at Step S1, an accelerator opening degree θap, a temperature Texh of an exhaust gas, an air fuel ratio AFexh, an engine rotational speed Ne, an intake negative pressure Pb and an injected-fuel amount Fuel are detected by the six sensors 12 to 17. At subsequent Step S2, an energy Qexh of the exhaust gas from the engine 1 is calculated as a product of the temperature Texh of an exhaust gas and a flow rate Mexh of the exhaust gas.

At subsequent Steps S3 to S6, a deficient (or surplus) portion ΔOut of the output due to the delay of response of the Rankine cycle system 2 is calculated. More specifically, at Step S3 a heat energy Qsteam of the vapor from the evaporator 3 with the response delay taken in consideration is calculated according to the following equation:

$$Q\text{steam}=Qexh\times\eta evp\times f(\tau exh)\times f(\tau evp)$$

Figure 4:
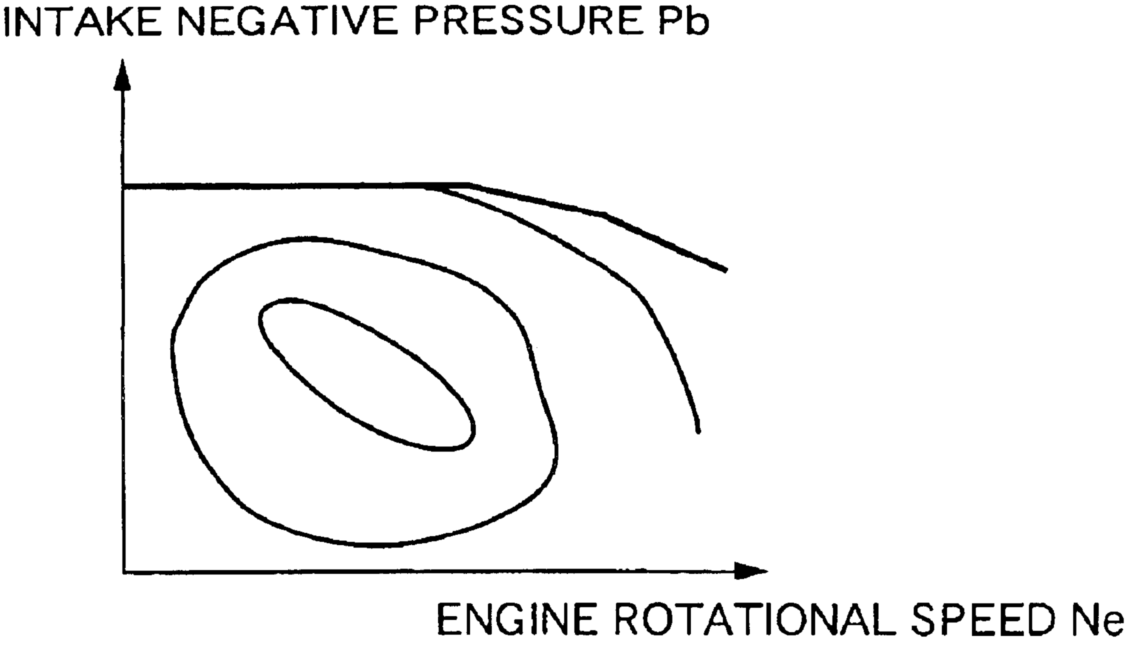

In this equation, ηevp is a heat exchange efficiency in the evaporator 3 and is searched from a map (see FIG. 4) with the engine rotational speed Ne and the intake negative pressure Pb used as parameters. The map in FIG. 4 is made by the actual measurement. In the equation, f(τexh) is a correcting function based on the first-stage response delay τexh, and f(τevp)is a correcting function based on the second-stage response delay τevp.

Figure 5:
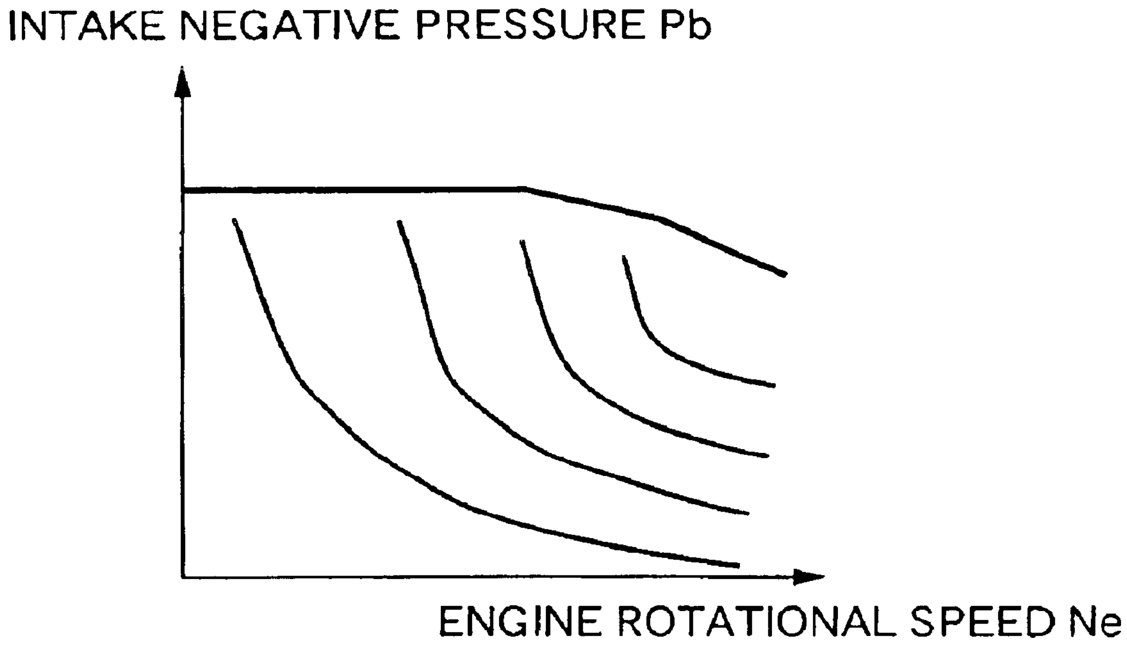

At subsequent Step S4, an output Out1 from the expander 4 with the response delay taken into consideration is calculated according to the following equation:

$$\text{Out1}=Q\text{steam}\times\eta evp$$

and at subsequent Step S5, an ideal output Out2 from the expander 4 which is free of a response delay is searched from a map (see FIG. 5) with the engine rotational speed Ne and the intake negative pressure Pb used as parameters. The map in FIG. 5 is made by the actual measurement. At Step S6, a deficient portion ΔOut of the output due to the response delay is calculated according to the following equation:

$$\Delta\text{Out}=\text{Out2}-\text{Out 1}$$

Figure 6:
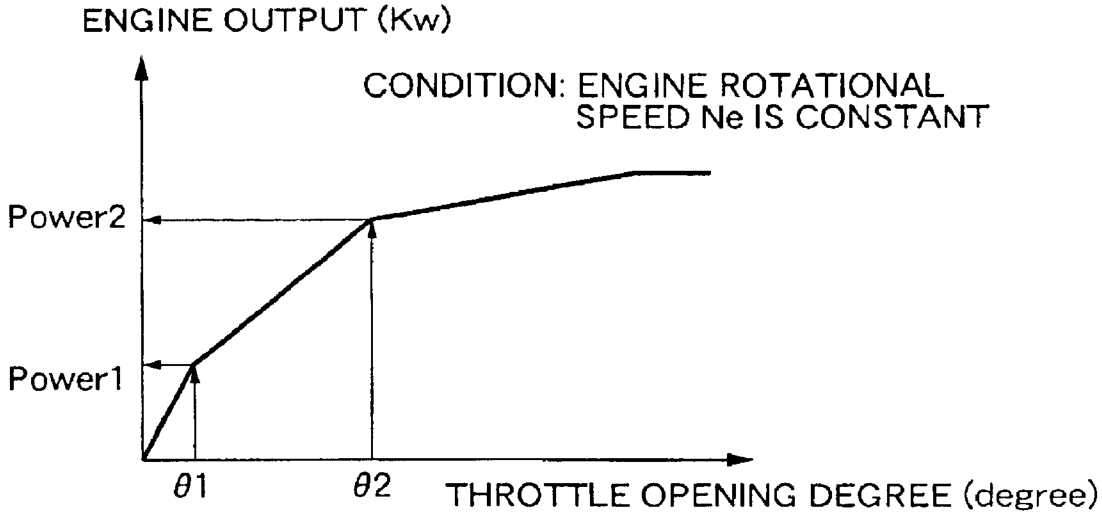

At subsequent Steps S7 to 10, a throttle opening degree θth for compensating for the deficient portion ΔOut of the output is calculated based on a map shown in FIG. 6 and made by the actual measurement. The map shown in FIG. 6 is made by taking the throttle opening degree θth as an axis of abscissas and the engine output as an axis of ordinates, wherein an operating line is established for every engine rotational speed Ne. First, at Step S7, an operating line is specified based on the current engine rotational speed Ne detected by the engine rotational speed sensor 15, and at Step S8, an accelerator opening degree θap detected by the accelerator opening degree sensor 12 is applied to the operating line, whereby a current engine output is determined. At subsequent Step S9, the deficient portion ΔOut of the output due to the response delay is added to the current engine output to provide a required engine output, and a required throttle opening degree θth corresponding to the required engine output is calculated. At Step S10, the operation of the throttle DBW motor 18 is controlled, so that required throttle opening degree θth is obtained.

Figure 7:
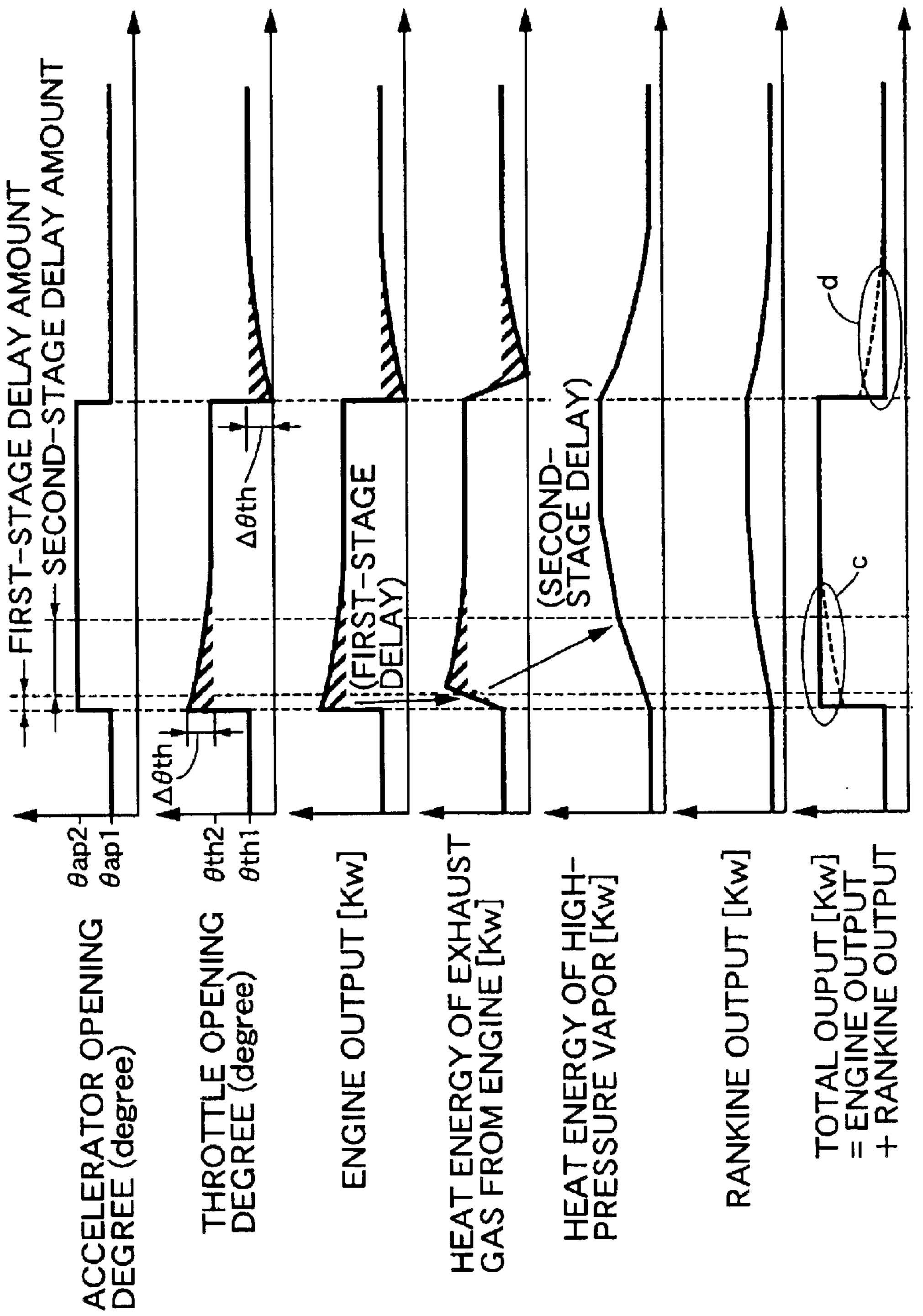

The above-described operation will be further described with reference to a time chart shown in FIG. 7.

For example, when the driver operates the accelerator pedal 8 in an order of "stepping on"→"retaining"→"returning" to change the accelerator opening degree θap stepwise, the opening degree of the throttle valve 7 operated through the DBW control unit 9 and the throttle DBW motor 18 is controlled so that it is temporarily larger than a value proportional to the accelerator opening degree θap by Δθth immediately after the driver has stepped on the accelerator pedal 8. Therefore, the engine output is also increased temporarily and correspondingly and thus, the deficient portion of the total output due to the delay of the response of the Rankine cycle system 2 can be offset by an increment in the engine output to generate a total output corresponding to the accelerator opening degree θap. In addition, the opening degree of the throttle valve 7 is controlled so that it is temporarily smaller than the value proportional to the accelerator opening degree θap by Δθth immediately after the driver has returned the accelerator pedal 8. Therefore, the engine output is also decreased temporarily and correspondingly and thus, the surplus portion of the total output due to the delay of the response of the Rankine cycle system 2 can be offset by a decrement in the engine output to generate a total output corresponding to the accelerator opening degree θap (see portions indicated by c and d).

As described above, the throttle opening degree θth is corrected by Δθth to operate the throttle valve 7, so that the delay of the response of the Rankine cycle system 2 is compensated for without matching of the throttle opening degree θth at 1:1 to the accelerator opening degree θap. Therefore, the total of the output from the engine 1 and the output from the Rankine cycle system 2 can be proportioned to the accelerator opening degree θap to eliminate the sense of incompatibility of the driver.

Figure 8:
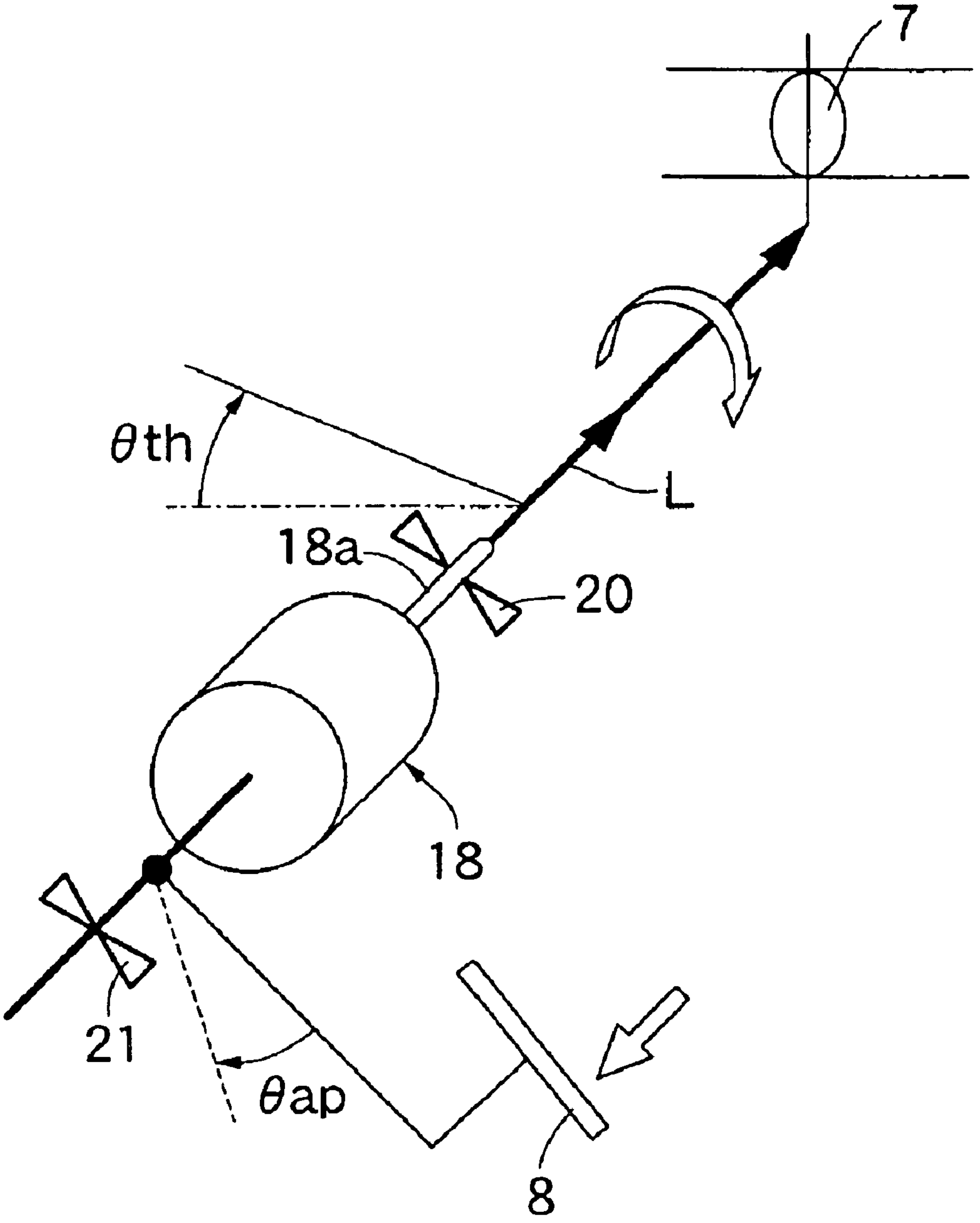
FIG. 8 is a diaphragm for explaining a DBW portion according to a second embodiment of the present invention.

A second embodiment of the present invention will now be described with reference to FIG. 8.

In the first embodiment, the throttle valve 7 and the accelerator pedal 8 are not connected mechanically to each other, and the throttle valve 7 is operated by only the throttle DBW motor 18. On the contrast, in the second embodiment, a throttle valve 7 is basically connected mechanically to an accelerator pedal 8 to be operated, so that only an opening degree corresponding to a correcting amount Δθth for the throttle opening degree θth is operated by a throttle DBW motor 18.

More specifically, the throttle DBW motor 18 having an output shaft 18*a* connected to the throttle valve 7 is supported on bearings 21 and 22, so that it can be rotated about an axis L of the output shaft 18*a*, and the accelerator pedal 8 is connected mechanically to the throttle DBW motor 18. Therefore, when a driver steps on the accelerator pedal 8, the throttle DBW motor 18 itself is rotated about the axis L, whereby the throttle valve 7 is opened or closed at an opening degree corresponding of an amount of accelerator pedal 8 stepped on. When the throttle DBW motor 18 is operated to rotate the output shaft 18*a*, the opening degree of the throttle valve 7 is increased or decreased by a value corresponding to an angle of rotation of the output shaft 18*a*.

According to the present embodiment, the DBW motor 18 may operate the throttle valve 7 to only the opening degree corresponding to the correcting amount Δθth for the throttle opening degree θth. Therefore, it is possible to reduce the size of the DBW motor 18 to provide a reduction in cost and moreover, to achieve the necessary and minimum operation of the throttle valve 7 by a stepping force provided by the driver, even when the control system is failed.

A third embodiment of the present invention will now be described.

In the third embodiment, an actual output Out1 from the expander 4 and an ideal output Out2 from the expander 4 are calculated at Steps S3 to S5 of the flow chart shown in FIG. 3 in the first embodiment by another technique which will be described below. At Step S3, a heat energy Qsteam of vapor from the evaporator and free from a response delay is calculated using a heat exchange efficiency ηevp of the evaporator 3 searched from the map in FIG. 4 according to the following equation:

$$Q\text{steam}=Qexh\times\eta evp$$

At subsequent Step S4, an output Out1 of the expander 4 with the response delay taken into consideration is calculated according to the following equation:

$$\text{Out}\mathbf{1}=Q\text{steam}\times\eta evp\times f(\tau exh)\times f(\tau evp)$$

wherein f(τexh) is a correcting function based on a first-stage response delay τexh, and f(τevp) is a correcting function based on a second-stage response delay τevp. At Step S5, an ideal output Out2 from the expander 4 and free from a response delay is calculated using a heat energy Qsteam of the vapor and an efficiency ηexp of the expander 4 according to the following equation:

$$\text{Out}\mathbf{2}=Q\text{steam}\times\eta exp$$

The efficiency ηexp of the expander 4 is searched from a map (see FIG. 9) made with the engine rotational speed Ne and the intake negative pressure Pb used as parameters. This map is made by the actual measurement.

Figure 9:
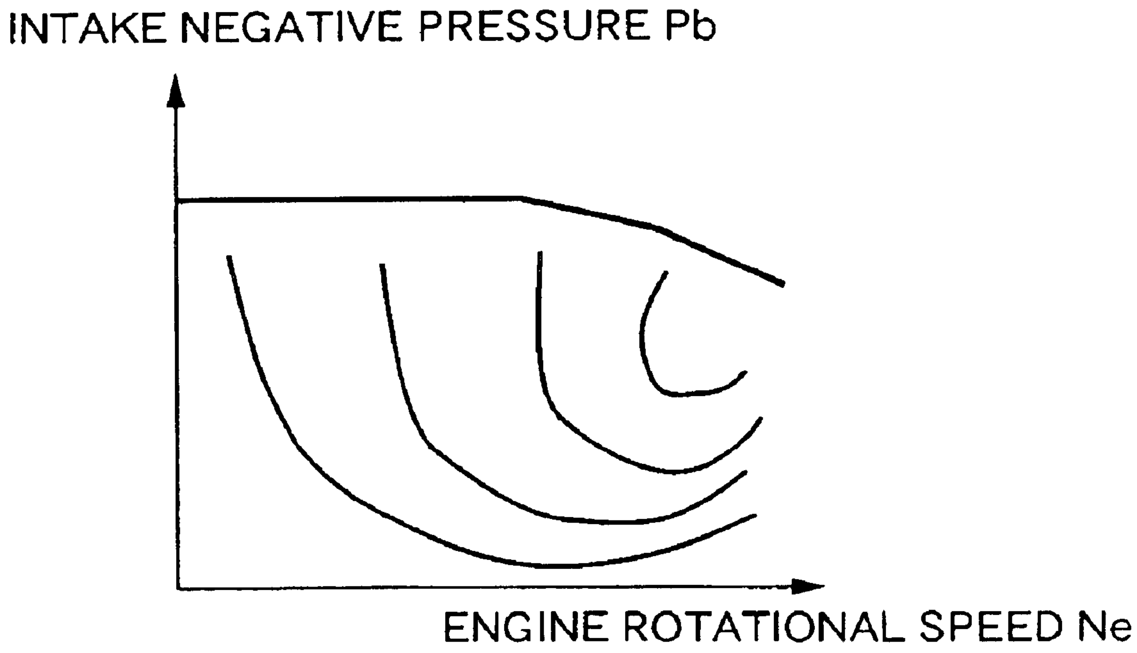
FIG. 9 is a diagram showing a map for searching an expander efficiency ηexp of an expander according to a third embodiment of the present invention.
Figure 10:
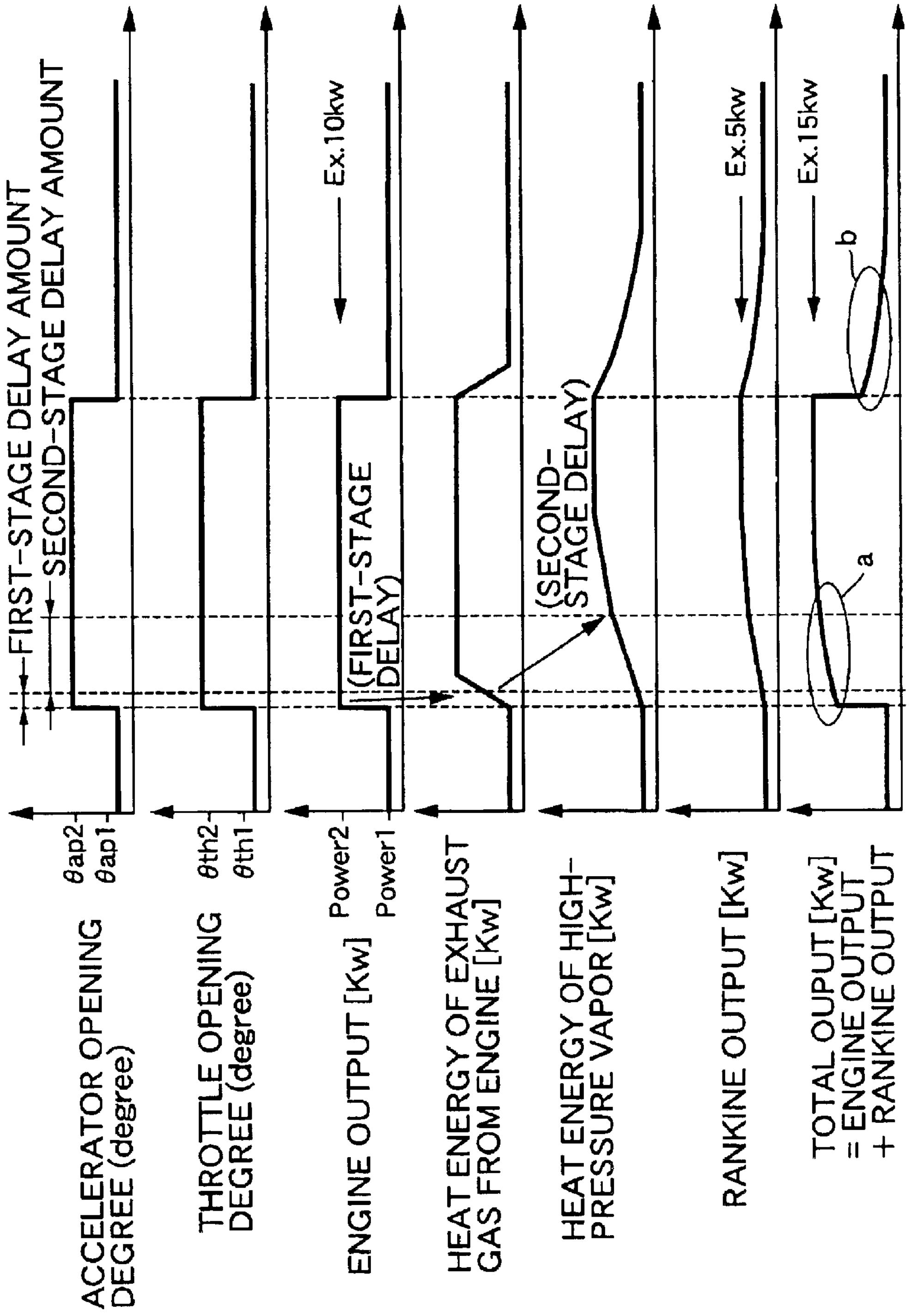
FIG. 10 is a time chart for explaining the operation of a conventional propelling system for a vehicle.

As described above, the ideal output Out2 from the expander 4 is searched directly from the map shown in FIG. 5 in the first embodiment, and on the contrast, the ideal output Out2 from the expander 4 is calculated by multiplying the heat energy Qsteam of the vapor by the efficiency ηexp of the expander 4 in the third embodiment. Thus, even if various corrections are added to the heat energy Qsteam of the vapor, the map for the efficiency ηexp of the expander 4 shown in FIG. 9 is not required to be corrected, and the ideal output Out2 from the expander 4 can be determined more simply and accurately.

Although the embodiments of the present invention have been described in detail, it will be understood that the present invention is not limited to the above-described embodiments, and various modifications in design may be made without departing from the spirit and scope of the invention defined in claims.

INDUSTRIAL APPLICABILITY

As discussed above, the propelling system for the vehicle according to the present invention is applicable to a vehicle including an engine for traveling of the vehicle, and a Rankine cycle system for converting a heat energy of an exhaust gas from the engine into a mechanical energy to output the mechanical energy.

What is claimed is:

1. A propelling system for a vehicle comprising an engine and a Rankine cycle system for converting heat energy of exhaust gas from the engine into mechanical energy to output the mechanical energy, so that a wheel is driven by a combined output from the engine and from the Rankine cycle system, wherein said propelling system includes a control means for controlling a throttle opening degree of the engine by correcting an accelerator opening degree commanded by a driver, and said control means controls the throttle opening degree of the engine, so that said combined output assumes a value corresponding to the accelerator opening degree, in order to compensate for a response delay of the output from the Rankine cycle system, and wherein when an increase in the accelerator opening degree is commanded to be an increased value, the throttle opening degree is increased to a value that is larger by a correction amount than a value proportional to the increased value of the accelerator opening degree, whereas when a decrease in the accelerator opening degree is commanded to be a decreased value, the throttle opening degree is decreased to a value that is smaller by a correction amount than a value proportional to the decreased value of the accelerator opening degree.

2. A propelling system for a vehicle comprising a Rankine cycle system for converting heat energy of exhaust gas from an engine into mechanical energy to output the mechanical energy, so that a wheel is driven by a combined output from the engine and from the Rankine cycle system, wherein said propelling system includes control means for controlling a throttle opening degree of the engine by correcting an accelerator opening degree commanded by a driver, and said control means controls the throttle opening degree of the engine, so that said combined output assumes a value corresponding to the accelerator opening degree, in order to compensate for a response delay of the output from the Rankine cycle system, the control means calculating the throttle opening degree based on the accelerator opening degree, the temperature of the exhaust gas, an air fuel ratio, an engine rotational speed, an intake negative pressure and an injected fuel amount.

3. The propelling system according to claim 2, wherein the control means controls the operation of a throttle motor which drives a throttle valve based on the throttle opening degree.

4. The propelling system according to claim 3, wherein a first response delay due to an abatement of heat in an exhaust port is generated until the temperature and flow rate of the exhaust gas reach steady states when the output from the engine is changed.

5. The propelling system according to claim 4, wherein a second response delay due to heat transfer in a heat-transfer pipe is generated when the temperature and flow rate of the exhaust gas are changed.

6. The propelling system according to claim 5, wherein the control means controls the operation of the throttle motor based on the first and second response delays.

7. The propelling system according to claim 3, wherein the throttle motor includes an output shaft connected to the throttle valve so that the throttle motor is rotated about an axis of the output shaft and an accelerator pedal is connected to the throttle motor.

* * * * *